US008150313B2

(12) United States Patent
Gayrard et al.

(10) Patent No.: US 8,150,313 B2

(45) Date of Patent: Apr. 3, 2012

(54) DEVICE FOR TRANSMITTING AND/OR RECEIVING SIGNALS WITH FREQUENCY RE-USE BY ASSIGNMENT OF A CELL FOR EACH TERMINAL, FOR A COMMUNICATION SATELLITE

(75) Inventors: Jean-Didier Gayrard, Cugnaux (FR); Eric Belis, Toulouse (FR)

(73) Assignee: Thales (FR)

(*) Notice: Subject to any disclaimer, the term of this patent is extended or adjusted under 35 U.S.C. 154(b) by 921 days.

(21) Appl. No.: 12/066,972

(22) PCT Filed: Sep. 22, 2006

(86) PCT No.: PCT/FR2006/050931

§ 371 (c)(1), (2), (4) Date: Jul. 25, 2008

(87) PCT Pub. No.: WO2007/034124

PCT Pub. Date: Mar. 29, 2007

(65) Prior Publication Data

US 2009/0051588 A1 Feb. 26, 2009

(30) Foreign Application Priority Data

Sep. 23, 2005 (FR) ..................................... 05 52836

(51) Int. Cl.
*H04Q 7/32* (2006.01)

(52) U.S. Cl. ...... 455/12.1; 455/13.3; 455/427; 455/428; 455/429; 455/430; 370/315; 370/316; 370/323; 342/350; 342/352; 342/354

(58) Field of Classification Search ................ 455/12.1, 455/13.1–13.4, 24, 7, 422.1, 403, 427, 428, 455/429, 430, 550.1, 445, 453, 450; 370/315, 370/316, 337, 318, 323; 725/63–72; 342/350, 342/353, 354

See application file for complete search history.

(56) References Cited

U.S. PATENT DOCUMENTS

| | | | | |
|---|---|---|---|---|
| 6,073,011 | A * | 6/2000 | Horstein | 455/427 |
| 6,422,148 | B1 | 8/2002 | Adams et al. | |
| 2003/0001773 | A1 * | 1/2003 | Harmon et al. | 342/352 |
| 2006/0072520 | A1 * | 4/2006 | Chitrapu et al. | 370/337 |

FOREIGN PATENT DOCUMENTS

| | | |
|---|---|---|
| EP | 0 854 590 | 7/1998 |

* cited by examiner

*Primary Examiner* — Keith Ferguson

(74) *Attorney, Agent, or Firm* — Lowe Hauptman Ham & Berner, LLP

(57) ABSTRACT

A device (D) is dedicated to transmitting and/or receiving signals representative of data in a communication satellite (SAT) having a fixed frequency bandwidth. This device (D) comprises transmission and/or reception means (MER) responsible for sending and/or receiving signals in multiple beams, and control means (MC) responsible for defining a chosen number of cells of chosen dimensions and positions, and configuring the transmission and/or reception means (MER) so as to define beams each associated with at least one of the defined cells, with a chosen carrier frequency based on the requirements of each of the cells and taking into account the frequency bandwidth available on the satellite (SAT).

18 Claims, 3 Drawing Sheets

DEVICE FOR TRANSMITTING AND/OR RECEIVING SIGNALS WITH FREQUENCY RE-USE BY ASSIGNMENT OF A CELL FOR EACH TERMINAL, FOR A COMMUNICATION SATELLITE

CROSS-REFERENCE TO RELATED APPLICATIONS

The present application is based on International Application No. PCT/FR2006/050931, filed on Sep. 22, 2006, which in turn corresponds to French Application No. 05 52836, filed on Sep. 23, 2005, and priority is hereby claimed under 35 USC §119 based on these applications. Each of these applications are hereby incorporated by reference in their entirety into the present application.

FIELD OF THE INVENTION

The invention relates to satellite communication networks, and more specifically the use of the frequency bandwidth allocated to the multiple-beam communication satellites within such networks.

BACKGROUND OF THE INVENTION

As those skilled in the art know, the cost-effectiveness of certain satellite data transmission (or collection) applications requires the satellites to have very large transmission capabilities in terms of bit rate. Such is notably the case with the so-called "broadband" multimedia applications, which often require capabilities of the order of several tens of gigabits per second.

Today, the frequency bandwidths that are allocated to the (tele)communication satellites are insufficient to allow them to reach such capacities.

To improve the situation, a frequency re-use technique is applied consisting, on the one hand, in subdividing the service area that the satellite must cover into cells, each of which is assigned a sub-bandwidth equal to a fraction of the bandwidth that is allocated to the service concerned, and on the other hand, in assigning identical sub-bandwidths to cells that are sufficiently well isolated from each other. By defining regular cell patterns, it is possible to re-use a number of sub-bandwidths several times, so making it possible to multiply, sometimes by several tens, the frequency resources.

However, this technique of frequency re-use by means of regular patterns presents a number of drawbacks.

A first drawback is the lack of flexibility. In practice, the dimensions and the position of each cell are fixed, and each cell is definitively allocated a sub-bandwidth. Consequently, any desire to modify the dimensions of a cell or the width of its sub-bandwidth will disrupt all the cells that use the same sub-bandwidth and therefore all the frequency allocation system, which means completely redefining the allocation.

A second drawback stems from the lack of flexibility. In practice, the cells that have traffic below the average waste frequency, whereas those that could have traffic greater than the average cannot obtain the frequency resources that would make it possible to satisfy the demand. This waste of frequency is both structural, since it results from a long term traffic planning, and cyclical, since it results from the failure to take into account short term traffic variations in time (for example, between day and night) and in space (for example because of local events).

SUMMARY OF THE INVENTION

The aim of the invention is therefore to remedy all or some of the abovementioned drawbacks.

To this end, it proposes a device dedicated to transmitting and/or receiving radiofrequency (or microwave) signals representative of data in a (multiple-beam) communication satellite having a fixed frequency bandwidth and comprising transmission and/or reception means capable of sending and/or receiving signals in multiple beams that can be associated with cells.

This device is characterized by the fact that it comprises control means responsible for defining a chosen number of cells of chosen dimensions and positions, and for configuring the transmission and/or reception means so as to define beams each associated with at least one of the defined cells, with a chosen (signal) carrier frequency and a chosen frequency bandwidth based on the requirements of each of the cells and taking into account the frequency bandwidth available on the satellite.

The device according to the invention can operate in three types of situations: a first situation in which it is exclusively dedicated to receiving signals originating from cells that it has defined, a second situation in which it is exclusively dedicated to transmitting signals to cells that it has defined, and a third situation in which it is dedicated to both receiving and transmitting signals from and to cells that it has defined.

To this end, its transmission and/or reception means can be arranged in the form of an active-type receiving antenna comprising at least:

S radiating (or source or even aerial) elements dedicated to receiving and/or transmitting different carrier signals, with S greater than one (1).

S first processing means each comprising an input/output specifically for operating as an input in receive mode in order to be supplied with signals received by one of the radiating elements and as an output in transmit mode in order to deliver signals from at most N different carriers, with N greater than 1, and N outputs/inputs specifically for operating as outputs in receive mode in order to respectively deliver N signals of N different carriers and as inputs in transmit mode in order to receive signals from N different carriers, S×N second processing means each comprising an input/output specifically for operating as an input in receive mode in order to be supplied with signals from one of the N carriers by one of the outputs/inputs of one of the first processing means and as an output in transmit mode in order to deliver signals resulting from a summing of the N carriers received on M inputs, and M outputs/inputs specifically for operating as outputs in receive mode in order to deliver each of the identical signals resulting from the duplication of the signals of one of the N carriers received on its input/output and as inputs in transmit mode in order to receive each of the signals from one of the N carriers, with M greater than 1, and N groups of M third processing means each dedicated to one of the N carriers, each third processing means comprising, on the one hand, S inputs/outputs, respectively coupled to the corresponding outputs/inputs of the second processing means so that a kth output/input of a second processing means is coupled to an ith input/output of a third corresponding processing means, and specifically for operating as inputs in receive mode in order each to be supplied by the signals duplicated by the corresponding output/input of the second corresponding processing means and as outputs in transmit mode in order to deliver each of the signals from the carrier of its group, obtained from received signals associated with one beam out of N×M, and on the other hand, an output/input specifically for operating as an output in receive mode in order to deliver signals from the carrier of the group, associated with one beam out of N×M and as an input in transmit mode in order to receive the signals that present the carrier of the group to which it belongs, associated with the beam out of N×M.

Its transmission and/or reception means can also comprise S fourth processing means each inserted between one of the radiating elements and the first corresponding processing means, and responsible for amplifying and/or digital/analog converting and/or frequency translating either the signals received by the radiating element in order to supply (in receive mode) the first corresponding processing means with amplified and/or digitized and/or frequency-translated signals, or signals originating from the first corresponding processing means in order to supply (in transmit mode) the corresponding radiating element with amplified and/or analog and/or frequency-translated signals.

Moreover, each first processing means can comprise N frequency-selective filters each specifically for selecting, in receive mode, one of the carrier frequencies of the signals received, out of at most N, and/or specifically for combining all of the signals of at most N different carriers received on its N outputs/inputs. Each first processing means can also (and if necessary) be responsible for changing the frequencies of the N carriers before delivering them to its N outputs/inputs or to its input/output.

Furthermore, its control means can be responsible for configuring each first processing means in order to fix the respective frequencies and bandwidths of the carriers of the signals delivered and/or received on each of its outputs/inputs, and the number of different carriers.

Furthermore, its control means can be responsible for activating a number of third processing means chosen according to the areas in which the defined cells are situated and/or the distances between defined cells.

Finally, its control means can be responsible for defining the chosen number of cells of chosen dimensions and positions according to instructions representative of the respective positions of the (ground) stations which must be situated in the cells and of the frequencies of the carriers and bandwidths that must respectively be allocated to these stations. At least a part of these instructions can be transmitted by a (ground) control station and/or by computation means installed in the satellite and determined by the latter from the signals of N×M carriers delivered on each output/input of the third processing means and/or by location means that it can include, responsible for detecting the positions of the stations from the signals that are received by its transmission/reception means.

The invention also proposes a communication satellite equipped with a device for transmitting and/or receiving radiofrequency (or microwave) signals of the type of that described hereinabove.

The invention is particularly well suited, although not exclusively, to broadband multimedia applications and to narrowband, or even very narrowband, data collection applications.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

The appended drawings can not only serve to complement the invention, but also contribute to its definition, as appropriate.

The object of the invention is to make it possible to increase the transmission capability of a (multiple-beam) communication satellite by a new use of the frequency bandwidth that is allocated to it for a given service.

Figure 1:
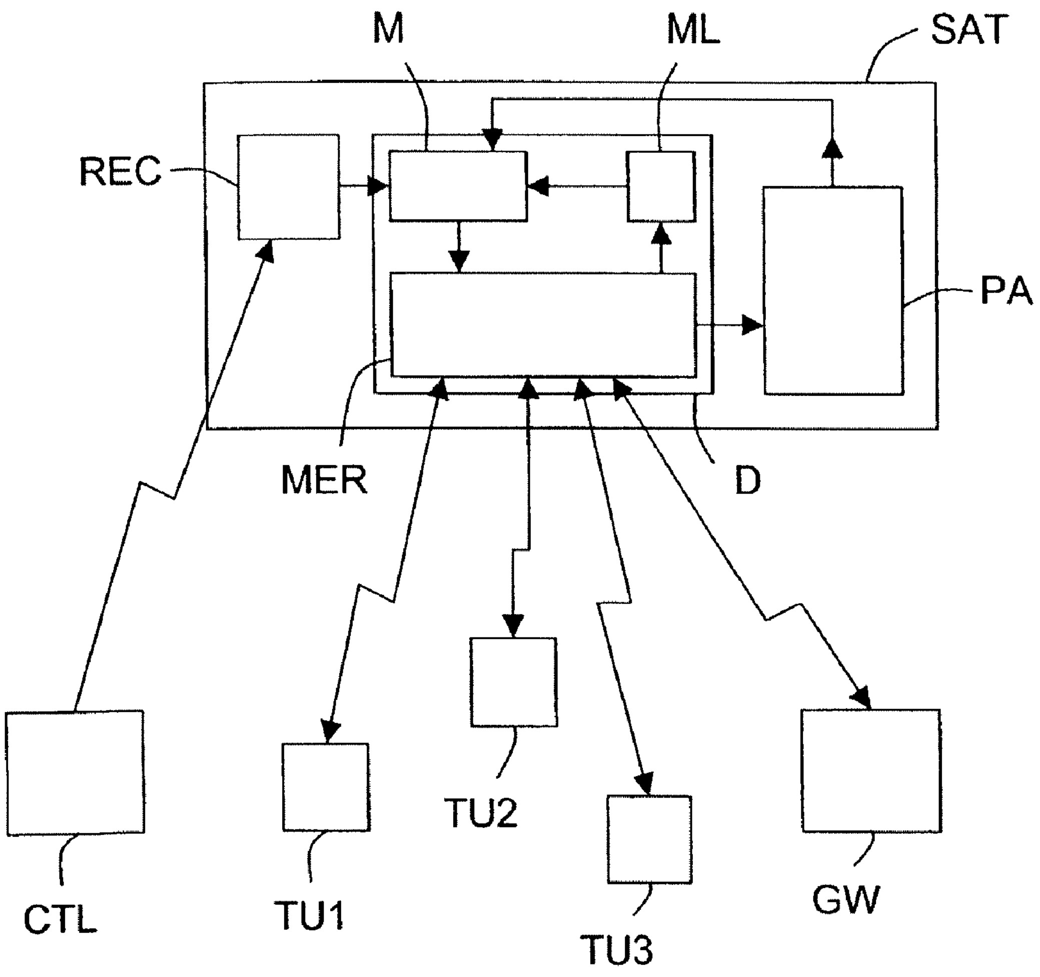
FIG. 1 very schematically and functionally illustrates the relationships existing between a communication satellite, equipped with an exemplary embodiment of a device for transmitting and/or receiving signals according to the invention, ground stations, a control station and a satellite communication gateway, FIG. 2 very schematically and functionally illustrates a first exemplary embodiment of a device for transmitting and/or receiving signals according to the invention, dedicated to reception, and FIG. 3 very schematically and functionally illustrates a second exemplary embodiment of a device for transmitting and/or receiving signals according to the invention, dedicated to transmission.

Reference is first of all made to FIG. 1 to describe an exemplary satellite communication system to which the invention applies.

The invention proposes installing in a (communication) satellite SAT a device for transmitting and/or receiving signals representative of data D.

Hereinafter, it will be assumed, by way of nonlimiting example, that the satellite SAT is used to exchange radiofrequency (or microwave) signals representative of broadband multimedia data between terrestrial communication terminals (or stations) TUh (here h=1 to 3, but it can take any integer value greater than one (1)) and a terrestrial satellite communication gateway (or "gateway") GW.

As will be seen later, the system can also comprise a ground control station CTL responsible for transmitting to the satellite SAT information and/or instruction messages. To receive these messages, the satellite SAT must have a reception module REC, independent of the onboard device D (as illustrated) or possibly part of the latter.

A device D according to the invention comprises at least signal transmission and/or reception means MER and a control module MC.

The signal transmission and/or reception means MER are arranged in such a way as to send and/or receive signals of different carriers in multiple beams which can be associated with ground cells in which are installed communication terminals (or stations) (hereinafter called "terminals") TUh. They preferably form an active-type antenna. Hereinafter, the term "active antenna MER" will be used to designate the signal transmission and/or reception means MER.

The control module MC is coupled to the active antenna MER. It is responsible for defining a chosen number of groups of at least one cell of chosen dimensions and positions, and for configuring the active antenna MER in order to define beams Fjk each associated, firstly, with at least one of the defined cells, secondly, with a chosen carrier frequency, and thirdly, with a chosen frequency (sub-)bandwidth, according to the requirements of each of the cells and taking into account the frequency bandwidth available on the satellite SAT for the service concerned.

In other words, the device according to the invention D combines two principles. The first principle consists in re-using the frequencies on the basis of the carriers (or narrow frequency bands). The frequency re-use is then no longer done at the sub-bandwidth level (typically several tens or hundreds of MHz of band), but at the level of the individual carrier (typically a few MHz). The second principle consists in creating (or defining) a cell for each carrier. The bandwidth allocated to each cell is then that of the individual carrier (or typically a few MHz). A group of at least one terminal TUh is associated with each cell, so that each terminal TUh of a group uses the carrier assigned to the cell of which it is part.

Figure 2:
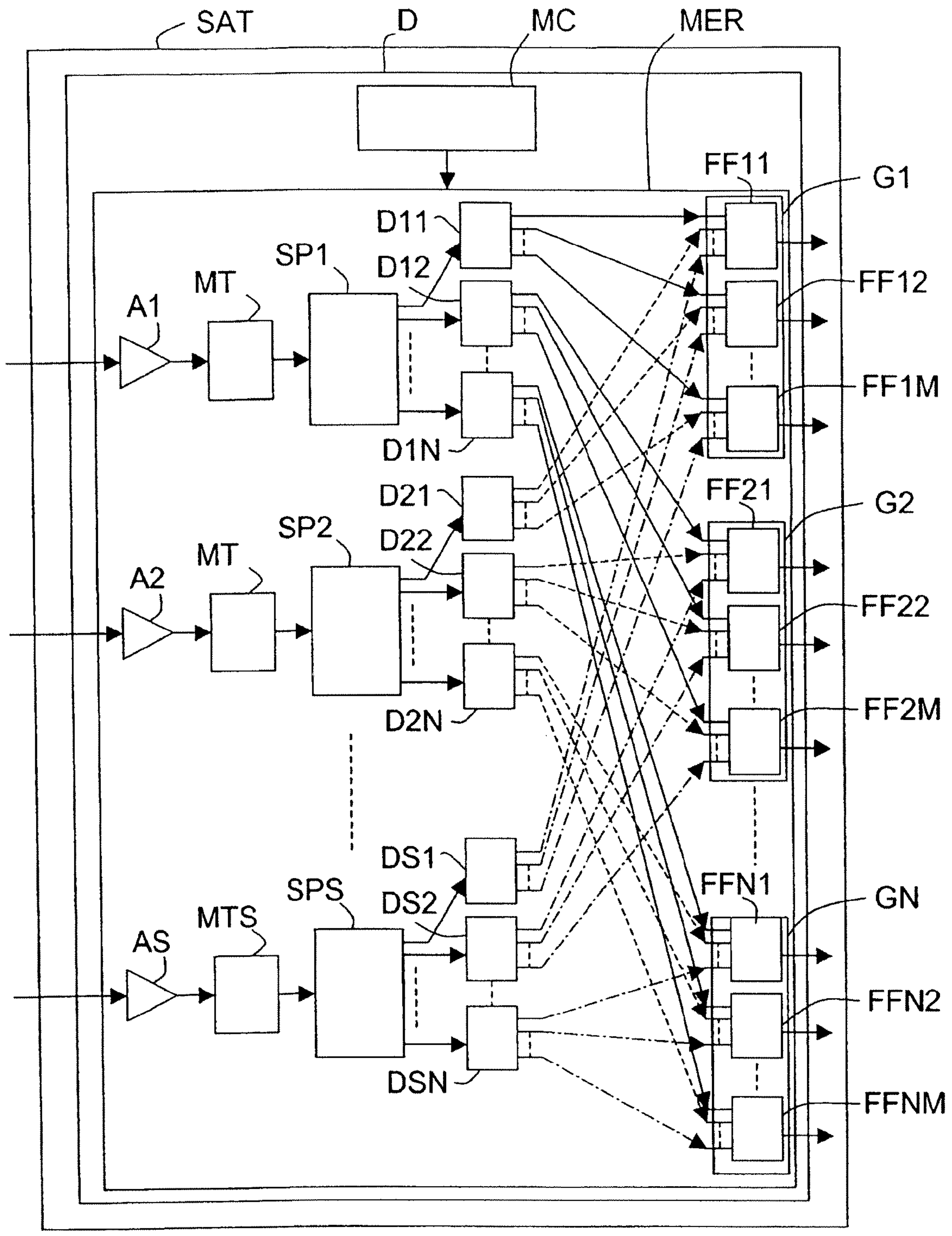

Reference is now made to FIG. 2 to describe a first exemplary embodiment of a device according to the invention D, exclusively dedicated to receiving signals originating from terminals situated in cells defined by its control module MC according to the requirements and the constraints.

As is illustrated in FIG. 2, the active antenna MER is here arranged as a receiver. It first comprises S radiating (or source or even aerial) elements Ai (i=1 to S, S>1) dedicated to receiving the signals of different carriers, which are transmitted by the terminals TUh located in the cells defined by the control module MC. For example, these radiating elements Ai are produced in the form of horns, printed elements (or "patches"), slots or helixes.

Although this is not an obligation, the output of each radiating element Ai is coupled to the input of a (fourth) processing module MTi. The latter can handle one or more operations, such as, for example, amplifying the analog signals that represent the signals received by the radiating element Ai with which it is coupled and/or performing a possible change of frequency and/or performing an analog/digital conversion.

Hereinafter, it will be assumed that the signals that are delivered to the output of each processing module MTi are of digital type. Consequently, the processes and operations that follow are here of digital type.

The active antenna MER also comprises S first processing modules SPi which each handle the function of carrier separation (or frequency demultiplexer) modules. Each first processing module SPi comprises an input EAi, supplied with digitized signals by the output of one of the fourth processing modules MTi, and N outputs SAij (j=1 to N, N>1) responsible for respectively delivering N digitized signals associated with N different carriers.

Each first processing module SPi for example comprises N frequency-selective digital filters. Each filter is responsible for selecting one of the carrier frequencies of the digitized signals received on the input EAi, out of at most N frequencies, in order to deliver the digitized signals associated with the filtered carrier Pj on its output which constitutes one of the outputs SAij.

Each first processing module SPi can, if necessary, be responsible for changing the frequencies of the N carriers before delivering them to its N outputs SAij.

The active antenna MER also comprises S×N second processing modules Dij which each handle the signal duplication function. Each second processing module Dij comprises an input EBij, coupled to the output SAij of the corresponding first processing module SPi, in order to be supplied with digitized signals presenting the filtered carrier Pj, and M outputs SBijk (k=1 to M, M>1) responsible for each delivering digitized signals obtained from the internal duplication of the signals received on an input EBij. In other words, each second processing module Dij is responsible for duplicating M times the digitized signals that it receives on its input EBij in order to deliver to its M outputs SBijk M identical digitized signals, associated with one and the same carrier Pj.

Finally, the active antenna MER also comprises N groups Gj of M third processing modules FFjk each handling the beam-forming function, each group Gj being dedicated to one of the N carriers Pj.

Each third processing module FFjk comprises S inputs ECijk (i=1 to S) respectively coupled to the outputs SBijk of the second processing modules Dij, so that the kth output SBijk of the second processing module Dij is coupled to the ith input ECijk of the third processing module FFjk. For example:

- if i=S, j=2 and k=2, then the second (k=2) output SBS22 of the second processing module DS2 is coupled to the Sth (i=S) input ECS22 of the second (k=2) third processing module FF22 of the second (j=2) group G2 associated with the carrier P2,
- if i=2, j=1 and k=M, then the Mth (k=M) output SB21M of the second processing module D21 is coupled to the second (i=2) input EC21M of the Mth (k=M) third processing module FF1M of the first (j=1) group G1 associated with the carrier P1,
- if i=1, j=N and k=M, then the Mth (k=M) output SB1NM of the second processing module D1N is coupled to the first (i=1) input EC1NM of the Mth (k=M) third processing module FFNM of the Nth (j=N) group GN associated with the carrier PN.

Each third processing module FFjk also comprises an output SCjk responsible for delivering digitized signals, resulting form the digitized signals received on its S inputs ECijk and associated with one beam out of N×M and presenting the carrier Pj of the group Gj to which it belongs.

In other words, the receiving active antenna MER delivers to each of its N×M outputs SCjk (j=1 to N, k=1 to M) digitized signals associated with a carrier Pj and originating from a cell associated with one of the N×M beams.

For example, if these N×M signals originating from the terminals TUh must be transmitted to a satellite gateway GW, the satellite SAT will multiplex them then transmit them by means of a modulated carrier to this satellite gateway GW.

It is important to note that the control module MC can be responsible for configuring each first processing module SPi so as to fix the respective frequencies and bandwidths of the carriers Pj of the (digitized) signals that it delivers to each of its outputs SAij, and the number of different carriers Pj. In other words, each of the N filters of each carrier selection module SPi can be activated or not and the frequency that it filters and/or its bandwidth can be fixed according to the requirements and constraints and taking into account the bandwidth available in the satellite SAT.

Moreover, the control module MC can be responsible for activating a number of third processing modules FFjk chosen according to the configuration of the areas containing the cells that it has defined and/or distances between these cells (in order for them to be sufficiently isolated from each other).

Figure 3:
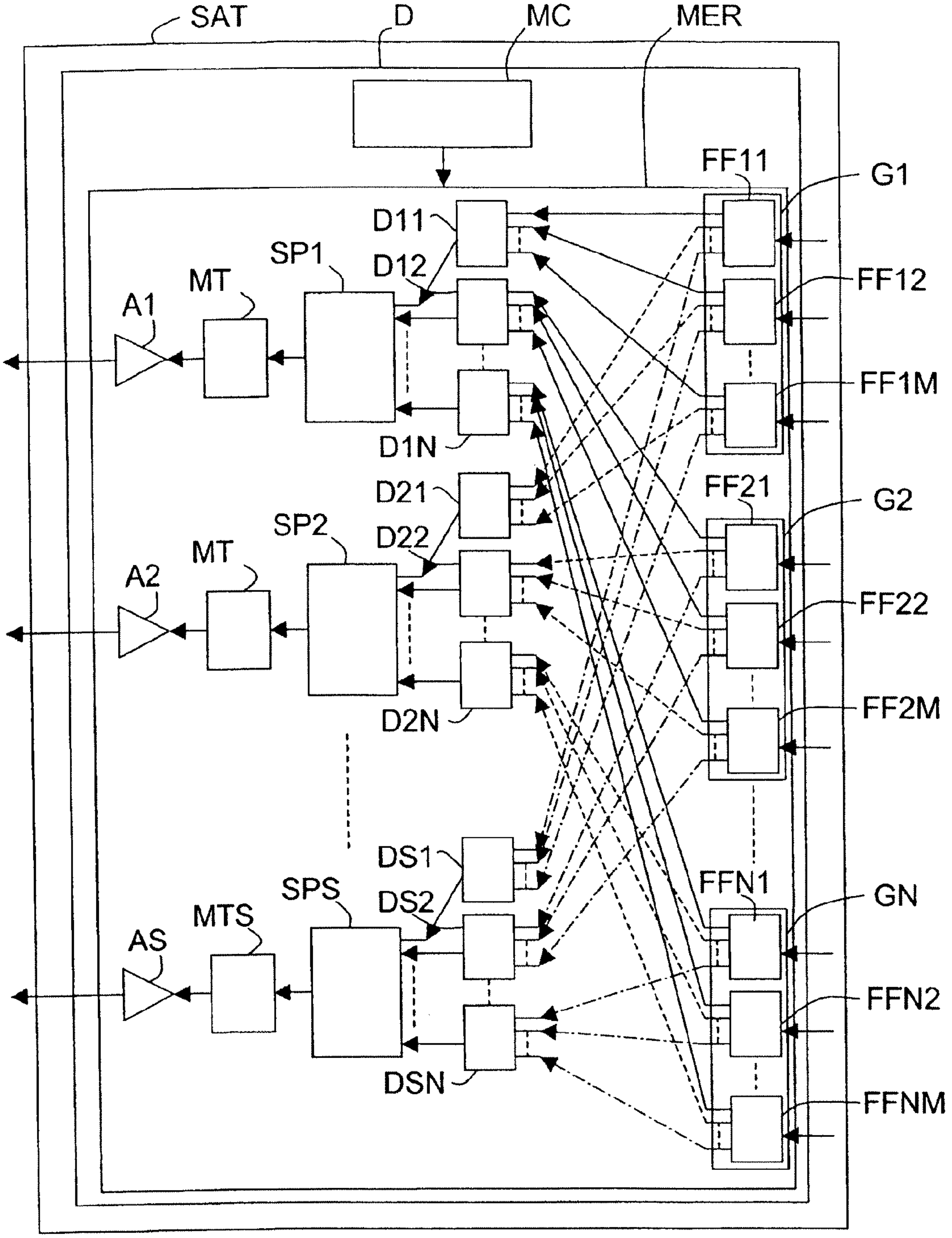

Reference is now made to FIG. 3 to describe a second exemplary embodiment of a device according to the invention D, exclusively dedicated to transmitting signals to terminals situated in cells or groups of cells defined by its control module MC according to the requirements and constraints.

As is illustrated in FIG. 3, the active antenna MER is here arranged as a transmitter. Because of the operating reciprocity of the elements that form the active antenna MER, that is, their ability to operate in one direction and in the opposite direction, the active antenna MER illustrated in FIG. 3 has an architecture that is identical to that of the active antenna illustrated in FIG. 2. Consequently, the operations performed by the component elements of the transmitting active antenna MER (FIG. 3) are the reciprocals of those that are performed by the equivalent elements that constitute the receiving active antenna MER (FIG. 2). The transmitting active antenna MER therefore comprises:

- N groups Gj (j=1 to N, n>1) of M third processing modules FFjk (k=1 to M, M>1) each handling the beam-forming function, and each group GJ being dedicated to N different carriers Pj. Each third processing module FFjk is the reciprocal of a third processing module described previously in the reception case (FIG. 2). It comprises an input SCjk responsible for receiving signals (preferably digitized) associated with one beam (out of N×M) corresponding to a cell and presenting the carrier of the group Gj to which it belongs, and S outputs ECijk (i=1 to S, S>1) responsible for each delivering digitized signals obtained from signals received on its input SCjk and presenting its carrier Pj,
- S×N second processing modules Dij each handling the signal concentration or summing function. Each second processing module Dij is responsible for calculating the algebraic sum of the M digitized signals originating from M third processing modules FFjk of a group Gj. Each second processing module Dij therefore comprises M inputs SBijk respectively coupled to the corresponding outputs ECijk of the third processing modules FFjk of the corresponding group Gj and an output EBij delivering digitized signals presenting one of the N carriers. The kth input SBijk of the second processing module Dij is coupled to the ith output ECijk of the third processing module FFjk,
- S first processing modules SPi each handling the carrier combiner (or frequency multiplexer) function. Each first processing module SPi is responsible for combining the digitized signals that originate from the N second processing modules Dij and that present the N different carriers Pj. Each first processing module SPi therefore comprises N inputs SAij respectively coupled to the outputs EBij of the N corresponding second processing modules Dij and an output EAi responsible for delivering digitized signals presenting at most N combined different carriers Pj. Each first processing module SPi comprises, for example, N frequency-selective digital filters. As indicated previously, each first processing module SPi can, if necessary, be responsible for changing the frequencies of the N carriers before combining them and delivering them (in combined form) to its output EAi,
- preferably S fourth processing modules MTi (optional) each comprising an input coupled to the output EAi of the corresponding first processing module SPi, in order to be supplied with digitized signals and an output responsible for delivering the signals in an analog form. As a complement to this digital/analog conversion, each fourth processing module MTi can, if necessary, amplify the signals and/or change (translate) the frequency of said signals,
- S radiating (or source or even aerial) elements Ai responsible for transmitting, to the at most N×M cells defined by the control module MC, the analog signals respectively delivered by the S fourth processing modules MTi.

As in the first exemplary embodiment, the control module MC can be responsible for configuring each first processing module SPi so as to fix the respective frequencies and bandwidths of the carriers Pj of the (digitized) signals that it delivers to each of its outputs SAij, and the number of different carriers Pj. In other words, each of the N filters of each first processing module SPi can be activated or not and the frequency that it filters and/or its bandwidth can be fixed according to the requirements and constraints and taking into account the bandwidth available in the satellite SAT.

Moreover, the control module MC can be responsible for activating a number of third processing modules FFjk chosen according to the configuration of the areas containing the cells that it has defined and/or the distances between these cells (in order for them to be sufficiently well isolated from each other).

FIGS. 2 and 3 represent exemplary embodiments in which the device according to the invention D operated either as a receiver or as a transmitter. However, because of the operational reciprocity described previously, the device D according to the invention can both transmit and receive signals to and from groups of cells defined by its control module MC, while retaining the same architecture as that described previously. In this case, an input becomes an input/output and an output becomes an output/input.

Whatever the operating mode of the device D (transmit and/or receive), its control module MC preferably defines the cells according to instructions representative of the respective positions of the terminals (or stations) TUh that must be contained in the cells and the frequencies of the carriers and bandwidths that must respectively be allocated to the terminals TUh.

These instructions can originate from one or more sources.

Thus, they can originate at least partly from a ground control station CTL. In this case, as indicated previously, the control station CTL transmits to the satellite SAT messages containing the instructions and the latter includes a reception module REC responsible for receiving them and communicating them to the device D. This reception module REC can, if necessary, be part of the device D.

As is illustrated in FIG. 1, the instructions can also originate at least partly from a computation module PA located in the satellite SAT. This computation module PA is then responsible for determining at least some of the instructions based on the signals of N×M carriers that are delivered to each output/input SCjk of the third processing means FFjk. This situation corresponds to that of a so-called regenerative satellite SAT.

In this regenerative case, the control module MC also handles the management of the resources. More specifically, it checks that the dimension (N) of the third processing means SPi (carrier selectors) and the number of third processing means FFjk (active beam formers) are suited to the traffic (number of terminals (or stations) TUh active), and it manages the assignment or the recovery of resources (by the first SPi and third FFjk processing means) according to the input or the output of the terminals TUh in the system.

The instructions can also originate at least partly from a location module ML preferably forming part of the device D, as illustrated in FIG. 1.

This location device ML is responsible for detecting and locating the transmissions from the terminals (or stations) TUh, based on the signals that are received by the transmission and/or reception module MER, in order to determine the positions of these terminals (or stations) TUh. To this end, each second processing module Dij can, for example, include an additional SBijk type output/input supplying the location module ML. The determining of the positions of the transmitting terminals TUh can then be done by means of an algorithm, for example of MUSIC type, intended to test the possible signal arrival directions.

The signal transmission and/or reception device D according to the invention, and notably its control module MC, its first SPi, second Dij, third FFjk, and possible fourth MTi processing modules can be produced in the form of electronic circuits, software modules (or computer modules), or a combination of circuits and software.

The device according to the invention is particularly advantageous when the traffic is not uniform and changes over time, given that it offers a frequency re-use rate that can be adapted and that is greater than those offered by the devices of the prior art. Moreover, the device according to the invention offers complete flexibility in frequency (because of the possibility of changing the bandwidths allocated to the terminals or stations) and in coverage (because it makes it possible to change the number and the position of the terminals or stations taken into account).

The invention is not limited to the signal transmission and/or reception device and multiple-beam communication satellite embodiments described hereinabove, purely by way of example, but it encompasses all the variants that those skilled in the art can envisage within the framework of the claims hereinafter.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A device for transmitting and/or receiving signals representative of data for a communication satellite having a fixed frequency bandwidth and comprising transmission and/or reception means specifically for sending and/or receiving signals in multiple beams that can be associated with cells, characterized in that it comprises control means arranged to define a chosen number of cells of chosen dimensions and positions, and to configure said transmission and/or reception means so as to define beams each associated with at least one of said defined cells, with a chosen carrier frequency and a chosen frequency bandwidth based on the requirements of each of said cells and taking into account the frequency bandwidth available on said satellite, wherein said transmission and/or reception means are arranged in the form of an active-type antenna comprising:

S radiating elements dedicated to receiving and/or transmitting different carrier signals, with S greater than one, S first processing means each comprising an input/output specifically to be supplied with signals received by one of said radiating elements and/or for delivering signals from at most N different carriers, and N outputs/inputs specifically for respectively delivering N signals of N different carriers, with N greater than 1, and/or for receiving signals from N different carriers, SxN second processing means each comprising an input/output specifically to be supplied with signals from one of the N carriers by one of said outputs/inputs of one of said first processing means and/or for delivering signals resulting from a summing of the N carriers received on M outputs/inputs, and M outputs/inputs specifically for delivering each of the identical signals resulting from the duplication of the signals of one of the N carriers received on said input/output and/or for receiving each of the signals from one of the N carriers, with M greater than 1, and N groups (Gj) of M third processing means each dedicated to one of the N carriers, each third processing means comprising, on the one hand, S inputs/outputs, respectively coupled to the corresponding outputs/inputs of said second processing means so that a kth output/input of a second processing means is coupled to an ith input/output of a third corresponding processing means, and so as each to be supplied by the signals duplicated by the corresponding output/input of the second corresponding processing means and/or to deliver each of the signals from the carrier of its group, obtained from received signals associated with one beam out of N×M, and on the other hand, an output/input specifically for delivering signals from the carrier of the group, associated with one beam out of N×M, and/or for receiving said signals presenting the carrier of the group to which it belongs, associated with said beam out of N×M.

2. The device as claimed in claim 1, wherein said transmission and/or reception means also comprise S fourth processing means inserted between one of said radiating elements and the first corresponding processing means, and arranged to amplify and/or digital/analog convert and/or frequency-translate the signals received by said radiating element or originating from said first corresponding processing means, in order to supply said first corresponding processing means with amplified and/or digitized and/or frequency-translated signals and/or supply said corresponding radiating element with amplified and/or analog and/or frequency-translated signals.

3. The device as claimed in claim 2, wherein each first processing means comprises N frequency-selective filters each specifically for selecting one of the carrier frequencies of the signals received on its input/output, out of at most N, and/or specifically for combining all of the signals of at most N different carriers received on its N outputs/inputs.

4. The device as claimed in claim 2, wherein each first processing means is arranged to change the frequencies of the N carriers before delivering them to its N outputs/inputs or to its input/output.

5. The device as claimed in claim 2, wherein said control means are arranged to configure each first processing means so as to fix the respective frequencies and bandwidths of the carriers of the signals delivered and/or received on each of its outputs/inputs, and the number of different carriers.

6. The device as claimed in claim 2, wherein said control means are arranged to activate a number of third processing means chosen according to the areas in which said defined cells are situated and/or the distances between defined cells.

7. The device as claimed in claim 1, wherein each first processing means comprises N frequency-selective filters each specifically for selecting one of the carrier frequencies of the signals received on its input/output, out of at most N, and/or specifically for combining all of the signals of at most N different carriers received on its N outputs/inputs.

8. The device as claimed in claim 7, wherein each first processing means is arranged to change the frequencies of the N carriers before delivering them to its N outputs/inputs or to its input/output.

9. The device as claimed in claim 7, wherein said control means are arranged to configure each first processing means so as to fix the respective frequencies and bandwidths of the carriers of the signals delivered and/or received on each of its outputs/inputs, and the number of different carriers.

10. The device as claimed in claim 1, wherein first processing means is arranged to change the frequencies of the N carriers before delivering them to its N outputs/inputs or to its input/output.

11. The device as claimed in claim 10, wherein said control means are arranged to configure each first processing means so as to fix the respective frequencies and bandwidths of the carriers of the signals delivered and/or received on each of its outputs/inputs, and the number of different carriers.

12. The device as claimed in claim 1, wherein said control means are arranged to configure each first processing means so as to fix the respective frequencies and bandwidths of the carriers of the signals delivered and/or received on each of its outputs/inputs, and the number of different carriers.

13. The device as claimed in claim 1, wherein said control means are arranged to activate a number of third processing means chosen according to the areas in which said defined cells are situated and/or the distances between defined cells.

14. The device as claimed in claim 1, wherein said control means are arranged to define the chosen number of cells of chosen dimensions and positions according to instructions representative of the respective positions of stations that have to be contained in said cells and of the frequencies of the carriers and bandwidths that respectively have to be allocated to said stations.

15. The device as claimed in claim 14, wherein a part of said instructions is transmitted by a control station.

16. The device as claimed in claim 14, wherein at least a part of said instructions is supplied by computation means installed in said satellite and determined by the latter from signals of N×M carriers delivered on each output/input of the third processing means.

17. The device as claimed in claim 14, comprising location means arranged to detect the positions of said stations from the signals received by said transmission/reception means.

18. A communication satellite for a communication network, comprising a device for transmitting and/or receiving signals as claimed in claim 1.

* * * * *